United States Patent [19]

Coutandin et al.

[11] Patent Number: 5,185,832
[45] Date of Patent: Feb. 9, 1993

[54] OPTICAL COUPLER FOR POLYMER OPTICAL WAVEGUIDES

[75] Inventors: Jochen Coutandin, Langenlonsheim; Jürgen Theis, Oberursel; Werner Groh, Lich; Andreas Brockmeyer, Liederbach, all of Fed. Rep. of Germany

[73] Assignee: Hoechst Aktiengesellschaft, Frankfurt am Main, Fed. Rep. of Germany

[21] Appl. No.: 690,858

[22] Filed: Apr. 24, 1991

[30] Foreign Application Priority Data

Apr. 26, 1990 [DE] Fed. Rep. of Germany ....... 4013307

[51] Int. Cl.$^5$ .............................................. G02B 6/26
[52] U.S. Cl. ...................................... 385/43; 385/46; 385/115
[58] Field of Search ............... 350/96.15, 96.16, 96.24, 350/96.25, 96.26; 385/24, 43, 46, 42, 48, 115, 147

[56] References Cited

U.S. PATENT DOCUMENTS 4,783,137 11/1988 Kosman et al. .................. 350/96.16

FOREIGN PATENT DOCUMENTS 0250151 4/1989 European Pat. Off. .
0315874 10/1990 European Pat. Off. .
3737930 5/1989 Fed. Rep. of Germany .
3833369 4/1990 Fed. Rep. of Germany .
WO89/02608 3/1989 PCT Int'l Appl. .

OTHER PUBLICATIONS

A. K. Agarwal, Fiber and Integrated Optics, vol. 6, No. 1, (1985), S. 27 ff.
Patent Abstracts of Japan Band 5, Nr. 126(p-75), Aug. 1981; & JP-A-56066812 (Fujitsu) May 6, 1981.

Primary Examiner—Frank Gonzalez
Attorney, Agent, or Firm—Curtis, Morris & Safford

[57] ABSTRACT

Process for producing an optical coupler for polymer optical waveguides by arranging the optical waveguides in the same sense and bundling them by means of a plastic shrink-on sleeve. In this process, two to $10^5$ polymer optical waveguides are arranged in the same sense and bundled and a plastic tube is put over the mixing region. Then a piece of plastic shrink-on sleeve is pushed over the plastic tube and the shrink-on sleeve is heated to a temperature at which it contracts. The shrinkage temperature of the shrink-on sleeve is inside the thermoelastic temperature range of the plastic tube. The optical waveguide bundle may be stretched during or after heating.

18 Claims, 1 Drawing Sheet

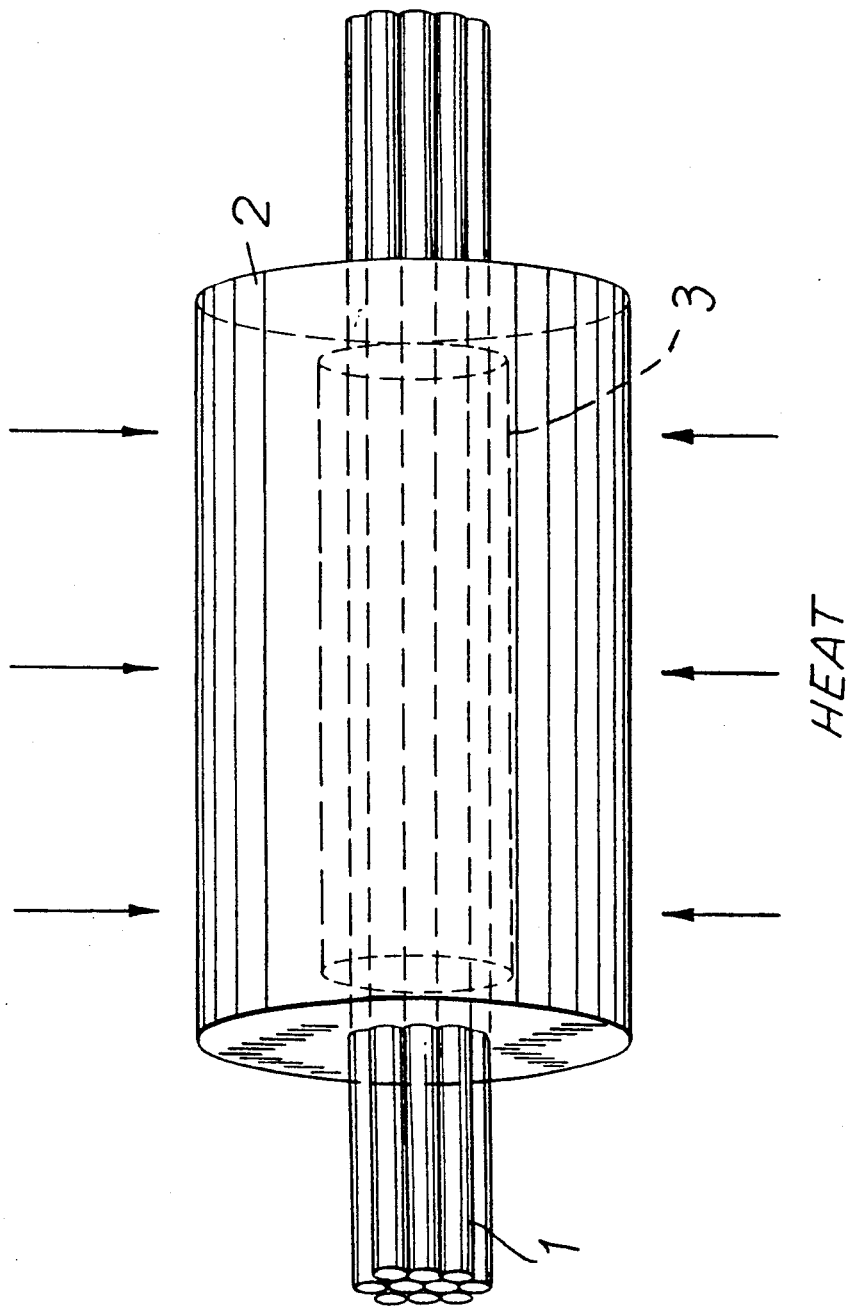

OPTICAL COUPLER FOR POLYMER OPTICAL WAVEGUIDES

BACKGROUND OF THE INVENTION

The invention relates to an economically beneficial process for producing optical couplers which have a high mechanical stability and are very resistant to thermal and weathering effects.

In passive optical waveguide networks, couplers serve as optical components for distributing the light signals from incoming optical waveguides over outgoing optical waveguides. Such couplers are composed of a transparent body which is connected to optical waveguides at the light input and at the light output side. In addition to couplers which are produced by bonding or fusing transparent moldings to optical waveguides, couplers are also known which are produced by twisting bundles of optical waveguides and stretching the twisted place (cf. Agarwal, Fiber Integr. Optics 6 (1) 27-53, 1987).

The production of such composite couplers is, however, complex and expensive; in addition, the throughput attenuation of such known couplers is difficult to reproduce so that the power varies by more than 1 dB between the various output fibers.

Furthermore, couplers are known in which fiber bundles made of polymer optical waveguides are fused together by means of a shrink-on sleeve (DE-A-3,737,930, WO-89/02608). In a process in accordance with WO-89/02608, only incomplete contact is produced between the fused core fibers, the shrink-on sleeve and a so-called "filler rod", so that a disturbed core-cladding boundary layer is produced which results in large optical losses.

A further major problem of many couplers, for example of the "biconical taper" coupler or also the combination of the shrink-on sleeve technique and the "biconical taper" process, is an only inadequate mechanical stability, in particular in the vicinity of the mixing region, which can be reduced only by supporting measures. In order to meet the stability requirements demanded in automobile construction it is therefore necessary to fix the couplers produced in position in special housings.

SUMMARY OF THE INVENTION

The object was therefore to find a process by which mechanically stable couplers can be simply and inexpensively produced and which yields couplers having low output attenuations and low power variations between the output fibers.

In this process there should be the possibility, depending on field of application, either of starting from finished optical waveguides from which the surrounding cladding material is removed only in the mixing region or, alternatively, of also producing compact optical waveguide bundles in which one can dispense with any removal of the cladding material.

It was found that a coupler which is stable to external effects and has minimum variations between the individual output fibers can be produced in a simple way by surrounding the optical waveguides in the mixing region with a plastic tube over which a shrink-on sleeve is pulled on in a subsequent step.

BRIEF DESCRIPTION OF THE DRAWING

FIG. 1 depicts heat being applied to a piece of a plastic shrink-on sleeve pushed over a plastic tube on the mixing region of bundled polymer optical waveguides.

DESCRIPTION OF CERTAIN PREFERRED EMBODIMENTS

For the process according to the invention, two to $10^5$ polymer optical waveguides (1) are arranged in the same sense and bundled. According to the invention the optical waveguides may optionally be twisted. A plastic tube (3) is put over the mixing region and then a piece of plastic shrink-on sleeve (2) is pushed over the tube. See FIG. 1. By heating the sleeve, it is caused to shrink.

The plastic tube increases the stability of the mixing region so that it is protected against external effects, for example impact, shock or bending loads. The tube must not be completely stiff but must be flexible to a certain extent, i.e. adapted to the optical waveguides in the mixing region on bending, but at the same time protecting them against fracture. However, the plastic tube also protects the mixing region against thermal and climatic effects so that such couplers exhibit very low deviations in attenuation even after exposures to high temperature.

Suitable materials for such plastic tubes are generally all the highly transparent polymers whose refractive index is less than the refractive index of the fibers, for example polymethyl methacrylate (PMMA), poly-4-methylpentene, polytetrafluoroethylene or fluorinated polymers.

A condition for a successful fusion is the matching of the mechanical and thermodynamic properties of optical waveguide and plastic tube. When the optical waveguide and plastic tube are heated, they convert from the glassy state to a thermoelastic state. The thermoelastic state is followed by a thermoplastic state. As the temperature rises, the plastic tube should convert to the thermoelastic state first, while the optical waveguide should only complete this transition at a higher temperature. However, before the plastic tube converts to the thermoplastic state, the optical waveguides must already be in the thermoelastic state. This results in a good optical contact of plastic tube and optical waveguide and at the same time, the cladding material is prevented from getting between the guides. The various temperature ranges can be matched to one another by altering the molecular weight of optical waveguide and plastic tube. If the shrinkage temperature of the shrink-on sleeve is inside the thermoelastic temperature range of the plastic tube, a dense bundling of tube and conductors occurs. During the fusion, the fiber bundle surrounded by the shrink-on sleeve and plastic tube may be stretched symmetrically or asymmetrically during or after heating, with the result that a double conical profile with a waist in the middle (biconical taper) forms. This double conical profile can also be achieved without stretching by heating the center of the shrink-on sleeve more strongly than the ends.

The shrinkage process of the shrink-on sleeve results in the deformation of the plastic tube, thereby causing the fused polymer optical waveguide bundle to be hermetically sealed off.

In the process according to the invention, the refractive index of the plastic tube should be less than the refractive index of the core fiber since it serves as an optical cladding for the mixing region. In this case, the original cladding material is removed from the fiber before the tube is pulled on in the mixing region.

An advantage of this process is that removal of the shrink-on sleeve and subsequent lacquering of the mixing region can be omitted since the plastic tube takes on the function of the optical cladding completely.

An additional reduction of the attenuation losses can for example be achieved by mirror-coating the plastic tube by vapor-coating with a metal, in particular aluminum, or by wrapping the non-vapor-coated tube in a mirror-coated plastic film.

The process described is, however, also suitable for producing compact optical waveguide bundles. Prior removal of the optical cladding of the optical waveguides is unnecessary for producing compact optical waveguide bundles.

The plastic tube has a length of 10 to 100 mm, preferably 40 to 60 mm, and an internal diameter of 1 to 50 mm, preferably 3 to 10 mm. In the preferred embodiment, the wall thickness is 0.5 to 25 mm, in particular 1 to 5 mm. Care should be taken to ensure that the internal surface of the tube is as smooth as possible.

Shrink-on sleeves which are suitable for the process according to the invention are described, for example, in DE-A-3,737,930 and WO-89/02608.

The shrink-on sleeve may be black, transparent or colored. Since the shrink-on sleeve does not serve as optical cladding, the refractive index of the shrink-on sleeve does not play any role in this type of manufacture. It is also possible to use a shrink-on sleeve whose inside wall is coated with a thermoplastic material. The shrink-on sleeve with internal coating is in general composed of a polyolefin.

Dual shrink-on sleeves may also be used for the process according to the invention. These sleeves are composed of an inner and outer shrink-on sleeve. When the shrinkage temperature of the outer sleeve is reached, the inner sleeve is already thermoplastic. The pressure which the outer shrink-on sleeve exerts is sufficient in order to produce a good joint between shrink-on sleeve, plastic tube and fibers.

The shrink-on sleeve normally has a length of 10 to 200 mm, preferably 50 to 100 mm, and has a diameter of 0.5 to 60 mm, in particular 1 to 20 mm.

The conventional materials for shrink-on sleeves, for example polyolefins, vinylidene fluoride or copolymers containing vinylidene fluoride or silicon rubber, begin, in general, to shrink at temperatures between 100° and 300° C., and during this process, the sleeve reduces in a ratio of 1.2:1 to about 4:1, which is dependent on the type of shrink-on sleeve.

Couplers in which both the input and the output fibers lie in one direction, i.e. the coupling region is bent in a U shape, are used, for example, in the automobile industry. Such bent couplers are particularly susceptible to external mechanical effects in the mixing range which is already stressed as it is. It is precisely as a result of the plastic tube that such specially shaped couplers acquire a high support in this region, with the result that they are particularly resistant to impact, pressure and torsion loadings.

To summarize, it may be stated that couplers having a particularly high mechanical stability can be produced by the process according to the invention. The plastic tube surrounding the optical waveguides gives the optical fiber a particularly effective protection against all external effects such as, for example, oil, dust or moisture and, in addition, has a very good resistance to thermal and climatic effects.

EXAMPLE 1

Production of a 7×7 star coupler with transmission mixer

The optical cladding was removed by means of petrol in a 5 cm region in the case of seven 0.5 m plastic optical waveguides made of polycarbonate and having a diameter of 1 mm each. Then a thin PMMA tube (n=1.492) was pushed over this region. The refractive index of the fibers was n=1.585. The PMMA tube had an internal diameter of 3 mm, a wall thickness of 1 mm and a length of 5 cm. Then a 7 cm long transparent shrink-on sleeve made of polyvinylidene fluoride and having an internal diameter of 6.4 mm was put over the PMMA tube and the fibers.

To separate the heating system and the shrink-on sleeve, a 7.5 cm long glass tube having an internal diameter of 7 mm was pulled over shrink-on sleeve, PMMA tube and fibers and the fibers were fixed in position. In the region of the shrink-on sleeve or of the PMMA tube, the temperature was increased to 195° C. When this temperature was reached, the shrink-on sleeve began to shrink and the PMMA tube with the fibers, whose softening temperature was below 195° C., began to fuse. The fused region (termed mixer rod) had a circular shape with a length l=2.5 cm and a diameter d=3 mm. Since the PMMA tube has a lower refractive index than the polycarbonate fibers (n=1.585), the PMMA tube acts simultaneously as optical cladding in addition to its stabilizing action. At the mixer rod/PMMA tube boundary layer, the light traveling in the mixer was totally reflected, with the result that almost no light could penetrate to the outside. After removing the glass tube, a mechanically stable star coupler is obtained.

The star coupler was tested for its resistance to cyclic thermal loading. For this purpose, the coupler was built into a climatic chamber and heat-treated for one week in an eight hour cycle between −40° C. and +100° C. The change in attenuation was 0.5 dB.

The 7×7 star coupler with the transmission mixer had an excess loss of 2.0 dB, with a power variation between any output fibers of 1.5 dB.

EXAMPLE 2

A transmission star coupler was produced in an analogous way to Example 1. The mixer rod was heated again to 180° C. by means of a hot-air source and bent into a U shape.

The measured excess loss was 2.5 dB, with a power variation between any output fibers of 2 dB.

The transmission star coupler was tested for its thermal resistance under the same conditions as the coupler from Example 1. Here again, the attenuation changes were only slight: +0.6 dB. Couplers produced in this way exhibited a high torsional load carrying capacity.

EXAMPLE 3

A 7×7 star coupler was produced in an analogous way to Example 1. In order to obtain lower attenuation losses, a polymethyl methacrylate tube vapor-coated with aluminum was used.

The transmission star coupler with a mirror-coated mixing region had an excess loss of 1.7 dB, with a power variation between the output fibers of 1.5 dB.

The difference in attenuation after a thermal loading, analogous to Example 1 and Example 2, was 0.6 dB.

EXAMPLE 4

A 7×7 star coupler based on stretched PMMA fibers (PMMA: n=1.492) is produced in a similar manner to Example 1. As a departure from Example 1, the optical cladding is removed with a toluene/acetone solution (2:1). The plastic tube is composed of a fluorinated polymer having a refractive index of n=1.37. The existing arrangement, composed of the fibers, the plastic tube and the shrink-on sleeve, is heated in a manner such that the temperature in the center of the tube is approximately 190° C., while the temperature in the edge region is approximately 10° C. lower. This temperature control results in an axial shrinkage of the stretched polymer optical fibers. Since the central part of the fused fibers are in a thermoplastic state and the outer region in a thermoelastic state, the development of a biconical shape inside the plastic tube occurs. The radial swelling of the fibers which normally occurs in the edge region is suppressed by the shrinkage force of the shrink-on sleeve.

The transmission star coupler so produced has a very low power variation of 1.3 dB. The excess loss is in the region of 1.5 dB.

The difference in attenuation was only 0.5 dB in the case of a cyclic thermal loading (from −40° C. to +85° C.).

We claim:

1. A process for producing an optical coupler including polymer optical waveguides by arranging the optical waveguides in the same sense and bundling them by means of a plastic shrink-on sleeve, which process comprises arranging two to $10^5$ polymer optical waveguides in the same sense and bundling them, putting a plastic tube over the mixing region, pushing a piece of plastic shrink-on sleeve over the plastic tube and heating the shrink-on tube to a temperature at which it contracts.

2. The process claimed in claim 1, wherein the plastic tube converts to the thermoelastic state before the polymer optical waveguides, but where the polymer optical waveguides complete the transition to the thermoelastic state before the transition of the plastic tube material to the thermoplastic state.

3. The process claimed in claim 1, wherein the shrinkage temperature of the shrink-on sleeve is inside the thermoelastic temperature range of the plastic tube.

4. The process claimed in claim 1, wherein the optical waveguide bundle is stretched during or after heating.

5. The process claimed in claim 1, wherein the shrink-on sleeve is heated more strongly in the center than at the ends.

6. The process claimed in claim 1, wherein the refractive index of the plastic tube is less than the refractive index of the core fiber.

7. The process claimed in claim 1, wherein the optical waveguides are free of cladding material at the joint and the plastic tube serves as optical cladding for the mixing region of the coupler.

8. The process claimed in claim 7, wherein the plastic tube is mirror-coated on the inside.

9. The process claimed in claim 7, wherein the plastic tube is additionally wrapped in a mirror-coated plastic film.

10. The process claimed in claim 1, wherein the length of the plastic tube is in the range from 10 to 100 mm.

11. The process claimed in claim 1, wherein the internal diameter of the plastic tube is in the range from 1 to 50 mm.

12. The process claimed in claim 1, wherein the plastic tube has a wall thickness in the range from 0.5 to 5 mm.

13. An optical coupler produced by the process claimed in claim 1, wherein the mixing region has a high mechanical strength and stability and is particularly temperature and weathering resistant.

14. The optical coupler claimed in claim 13, wherein the mixing region may have a bent shape.

15. The process claimed in claim 3, wherein the shrinkage temperature is between 100° and 300° C.

16. The process claimed in claim 10, wherein the length of the plastic tube is in the range from 40 to 60 mm.

17. The process claimed in claim 11, wherein the internal diameter of the plastic tube is in the range from 3 to 10 mm.

18. The process claimed in claim 11, wherein the plastic tube has a wall thickness in the range from 1 to 2 mm.

* * * * *